(12) United States Patent
Minter et al.

(10) Patent No.: US 12,017,514 B2
(45) Date of Patent: Jun. 25, 2024

(54) HVAC AIR RETRIEVAL SYSTEM FOR WORK MACHINE

(71) Applicant: Caterpillar SARL, Geneva (CH)

(72) Inventors: Mark Andrew Minter, Apex, NC (US); Benjamin Michael Cheek, Cary, NC (US)

(73) Assignee: Caterpillar SARL, Geneva (CH)

( * ) Notice: Subject to any disclaimer, the term of this patent is extended or adjusted under 35 U.S.C. 154(b) by 97 days.

(21) Appl. No.: 17/478,742

(22) Filed: Sep. 17, 2021

(65) Prior Publication Data

US 2023/0103167 A1 Mar. 30, 2023

(51) Int. Cl.
| | | |
|---|---|---|
| *B01D 45/02* | (2006.01) | |
| *B01D 46/00* | (2022.01) | |
| *B01D 50/20* | (2022.01) | |
| *B60H 3/06* | (2006.01) | |
| *E02F 9/16* | (2006.01) | |
| *E02F 3/34* | (2006.01) | |

(52) U.S. Cl.
CPC ........... *B60H 3/0641* (2013.01); *B01D 45/02* (2013.01); *B01D 46/0027* (2013.01); *B01D 50/20* (2022.01); *E02F 9/16* (2013.01); *E02F 9/163* (2013.01); *B01D 2279/40* (2013.01); *E02F 3/3414* (2013.01)

(58) Field of Classification Search
CPC ........ B60H 3/0641; B60H 2001/00085; B60H 1/00378; B60H 1/00564; B60H 3/0616; B60H 2001/00242; B01D 45/02; B01D 46/0027; B01D 50/20; B01D 2279/40; E02F 9/16; E02F 9/163; E02F 3/3414; E02F 9/0858
See application file for complete search history.

(56) References Cited

U.S. PATENT DOCUMENTS

| | | | | |
|---|---|---|---|---|
| 4,150,474 A | * | 4/1979 | Bauer | E02F 9/163 |
| | | | | 228/173.6 |
| 4,344,356 A | * | 8/1982 | Casterton | B62D 33/0617 |
| | | | | 454/158 |
| 4,531,453 A | * | 7/1985 | Warman | B60H 1/00378 |
| | | | | 55/330 |
| 5,308,279 A | * | 5/1994 | Grinberg | B60H 1/00378 |
| | | | | 454/151 |
| 6,223,807 B1 | * | 5/2001 | Asche | B60H 1/00378 |
| | | | | 454/156 |

(Continued)

*Primary Examiner* — Dung H Bui

(57) ABSTRACT

A work machine, such as a skid steer loader or a compact track loader, includes an air intake assembly for a heating, ventilation, and air conditioning (HVAC) unit. A conduit integrated into a structure supporting a roof over an operator cab accepts air and water from the atmosphere through an air inlet proximate the roof. A debris outlet downstream in the conduit allows gravity to return the water to the environment. Between the air inlet and the debris outlet, an orifice in the conduit connects to an air duct through which the air may be diverted by suction from the HVAC unit. An air filter at the end of the air duct removes remaining particulates from the air prior to conditioning by the HVAC unit. Sizing the cross-sectional areas of the air path to exceed a cross-sectional area of an inlet to the air filter and providing a substantially straight air path avoids resistance to air flow, resulting in efficient intake of cleaner air.

20 Claims, 6 Drawing Sheets

(56) References Cited

U.S. PATENT DOCUMENTS

| | | | |
|---|---|---|---|
| 7,377,848 B2 | 5/2008 | Voit, II et al. | |
| 7,399,221 B2 | 7/2008 | Masumoto et al. | |
| 7,401,848 B2 | 7/2008 | Haboon et al. | |
| 9,011,220 B2 | 4/2015 | Mayr et al. | |
| 9,139,979 B2 * | 9/2015 | Nagami | E02F 9/16 |
| 9,957,929 B2 | 5/2018 | Zeilenga et al. | |
| 10,160,287 B2 * | 12/2018 | Amura | B60H 1/262 |
| 10,422,108 B2 | 9/2019 | Yamashita et al. | |
| 2004/0124030 A1 * | 7/2004 | Lamela | B60K 17/04 |
| | | | 180/305 |
| 2005/0012360 A1 * | 1/2005 | Richards | E02F 9/163 |
| | | | 296/190.03 |
| 2006/0186224 A1 * | 8/2006 | Yoshii | B60H 1/00378 |
| | | | 239/548 |
| 2011/0250832 A1 * | 10/2011 | Mayr | B60H 3/0608 |
| | | | 454/237 |
| 2012/0108156 A1 * | 5/2012 | Himanen | B60H 3/0633 |
| | | | 55/385.3 |
| 2013/0001984 A1 | 1/2013 | Spencer | |
| 2020/0079175 A1 | 3/2020 | Fiocchi et al. | |
| 2021/0230832 A1 * | 7/2021 | Parry-Jones | E02F 9/16 |
| 2023/0058080 A1 * | 2/2023 | Lykken | E02F 3/3414 |

* cited by examiner

HVAC AIR RETRIEVAL SYSTEM FOR WORK MACHINE

TECHNICAL FIELD

The present disclosure relates to a work machine having an air retrieval system for a heating, ventilation, and air conditioning (HVAC) system in a work machine. More specifically, the present disclosure relates to a compact loader having an air retrieval assembly integrated into supporting structure for a roof, and a method for diverting fresh air drawn into a conduit within the structure while avoiding non-gaseous debris also entering the conduit.

BACKGROUND

Compact loaders, such as skid steer loaders or compact track loaders, are relatively small work machines that can provide a variety of lifting and moving functions in tight spaces. Well balanced and highly maneuverable, compact loaders often are used in rugged outdoor environments, such as with heavy construction or mining. A compact loader has lift arms that pivot on left and right sides of the frame and a work tool such as a shovel manipulated by the lift arms. Wheels or tracks that may be separately driven, combined with the relatively small size of the loader, contribute to the high maneuverability of the machine. An operator cab is centered or somewhat forward on a frame where an operator controls the compact loader.

A work machine, such as a compact loader, often includes an HVAC unit to condition the environment within the operator cab. Air drawn into the HVAC unit from the outside environment, however, must be relatively free of particulates to provide a clean environment for the operator. As air is drawn into the HVAC unit, filters may help block the passage of some particulates, but the dirty or dusty environments in which compact loaders often work can saturate the filters. Air-intake ports and air filters for HVAC units in compact loaders are often provided near the wheels or tracks, which enables easy servicing of the filters. But the air near the wheels or tracks often has large quantities of particulates that will be caught in filters. Therefore, the air filters for HVAC units need to be cleaned daily and replaced frequently, causing a material cost for replacement filters and expense for the labor of servicing.

Elevating an air-intake port with ducting on the exterior of the operator cabin, as with some off-road vehicles, may decrease the amount of particulates drawn into the air filter. But compact loaders complicate that approach for several reasons. First, exterior ducting may interfere with the lift arms that move up and down close to the sides of the operator cab in a compact loader. Also, a compact loader is at times operated in situations where it could tip or roll over, potentially damaging any exterior ducting. Similarly, the operator cab in a compact loader is generally pivotable upwards and backward to enable access under the operator cabin for servicing, which increases the chance of damaging exterior ducting for an HVAC unit.

One approach for drawing in fresh air for an HVAC unit with decreased particulates in a work machine is described in U.S. Pat. No. 9,011,220 ("the '220 patent"). The '220 patent describes air intakes in the roof of a tractor to minimize the ingress of dust and debris. Ducting horizontally across the roof and vertically down hollow pillars at the corners of the cab provides multiple paths from the air intakes to an HVAC unit mounted on the floor of the cab. Air from the hollow pillars makes a right-angle turn into an air filter located in the rear of the cab behind an operator seat, while water or other debris collects at a bottom of the pillars. The '220 patent states, however, that its design requires use of a pressurization blower, in addition to a main HVAC blower, to overcome the pressure drop caused by the long and restrictive paths between its air intakes and the HVAC unit and that its debris collection must be flushed periodically. According to the '220 patent, without the pressurization blower, the airflow from the HVAC blower would be too small for reasonable system performance. As a result, the system of the '220 patent introduces complexity and cost, which is not desirable for use on compact loaders or other work machines.

Examples of the present disclosure are directed to overcoming deficiencies of such systems.

SUMMARY

In an aspect of the present disclosure, a work machine includes a frame defining a horizontal axis and a vertical axis for the work machine and has a left side and a right side with respect to a direction of forward travel of the work machine. Traction devices are coupled to the left side and the right side of the work machine, and an operator cabin is situated between the left side and the right side of the work machine with a roof covering the operator cabin. The work machine includes a conduit extending downwardly from the roof with respect to the vertical axis. The conduit is substantially enclosed and has an inlet into the conduit from the atmosphere proximate to the roof, an outlet into the atmosphere downstream from the inlet and distal to the roof, and an orifice into the conduit between the inlet and the outlet. An air duct has a first end connected to the orifice of the conduit and a second end coupled to an air filter that is positioned for access at an external location of the operator cabin. A heating, ventilation, and air conditioning (HVAC) unit of the work machine is configured to draw ambient air from the inlet and through the air filter.

In another aspect of the present disclosure, a rollover protection structure (ROPS) for a compact loader has a protective cage surrounding at least a portion of an operator compartment of the compact loader, a roof covering the operator compartment, and a plurality of metal sheets supporting the roof. The plurality of metal sheets are substantially orthogonal to the roof and have an upper portion and a lower portion with the upper portion being closer to the roof. The metal sheets include an outer sheet and an inner sheet at least partially enclosing a channel. An inlet passes through the outer sheet in the upper portion of the metal sheets and fluidly connects ambient atmosphere outside the operator compartment with the channel. An air outlet passes through the inner sheet below the inlet with respect to a vertical axis of the ROPS and fluidly connects the channel with an air duct for an HVAC unit of the operator cabin. A debris outlet from the channel is positioned in the lower portion of the metal sheets below the air outlet, with respect to the vertical axis of the ROPS, and fluidly connects the channel with the ambient atmosphere. The ROPS includes an air filter connected to the air duct and associated with the HVAC unit.

In yet another aspect of the present disclosure, a method for providing air to an HVAC unit of a mobile machine includes at least partially supporting a roof on the mobile machine with a hollow pillar, attaching a first end of an air duct to an opening through an inside surface of the hollow pillar, and connecting a second end of the air duct to an air filter associated with the HVAC unit. The method includes causing, by the HVAC unit, ambient air to flow from atmosphere through an inlet in an outside surface of the hollow pillar proximate the roof and into a passageway of the hollow pillar. Non-gaseous debris is also received through the inlet and into the passageway. The method further includes diverting, by the HVAC unit, the ambient air from the passageway and into the opening below the inlet on the hollow pillar with respect to a vertical axis of the mobile machine, enabling the non-gaseous debris to drop past the opening and through a debris outlet into the atmosphere, and drawing, by the HVAC unit, the ambient air from the air duct and through the air filter.

DETAILED DESCRIPTION

Figure 1:
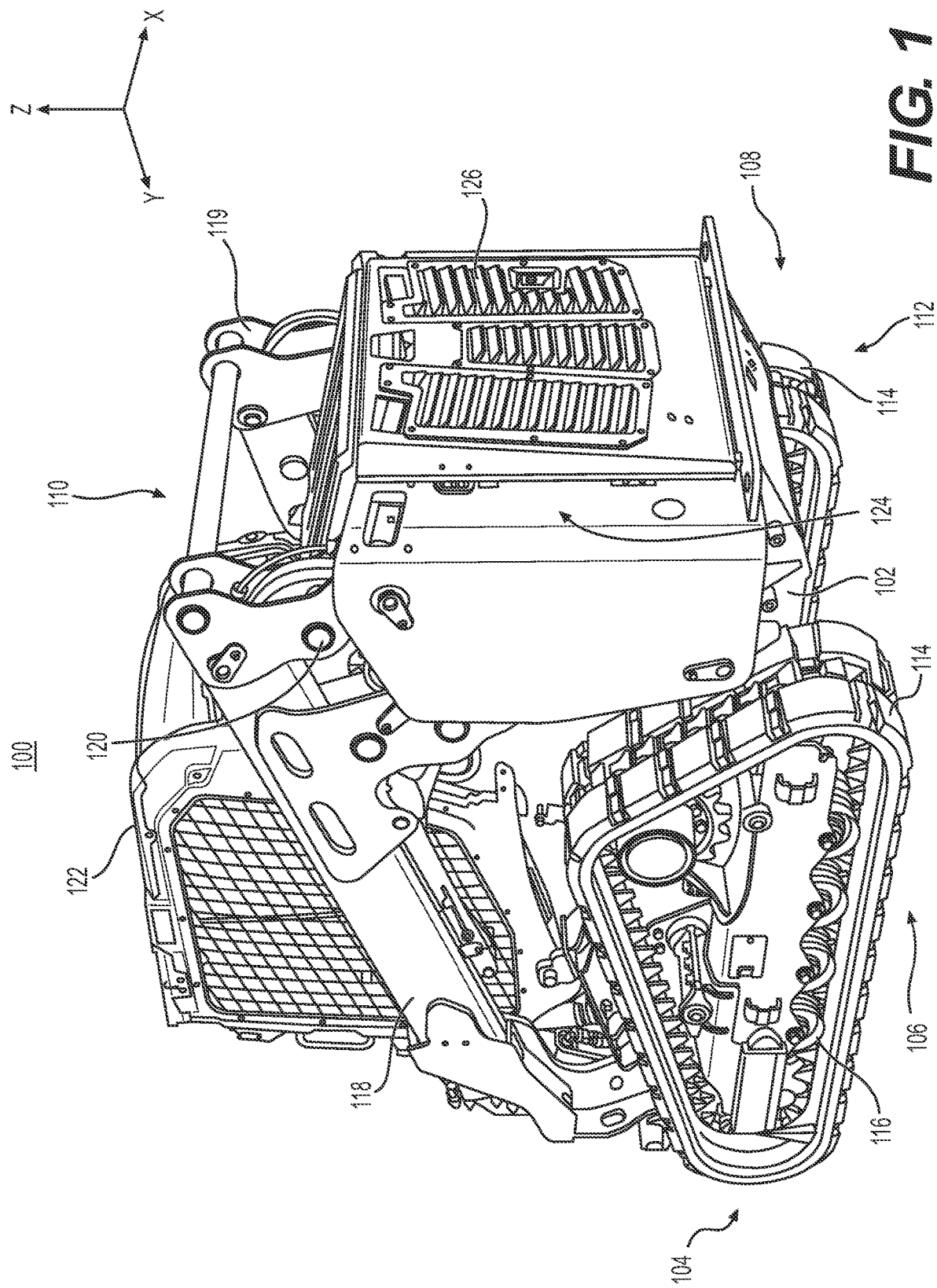
FIG. 1 is an isometric view of a compact loader in accordance with an example of the present disclosure.

Wherever possible, the same reference numbers will be used throughout the drawings to refer to the same or like parts. FIG. 1 illustrates an isometric view of a work machine 100 within an XYZ coordinate system as one example suitable for carrying out the principles discussed in the present disclosure. Work machine 100 is illustrated in FIG. 1 as a compact track loader, although work machine 100 may be any type of compact loader known in the field by a variety of names, such as a skid steer loader, tracked skid steer loader, multi-terrain loader, etc. Often the terminology applied to work machine 100 turns on the form of traction of the machine, with skid steer loaders having wheels with tires and tracked skid steer loader machines or multi-terrain loader machines utilizing an endless track undercarriage to provide greater traction in mud, snow, ice and the like. As discussed further below, the form of traction for work machine 100 is not material to the examples described, and "compact loader" is used generically to refer to the overall class of loaders.

Similarly, the term "machine" as used in this disclosure refers to any machine that performs some type of work operation associated with an industry, such as mining, construction, farming, landscaping, or transportation. Compact loaders, such as a compact track loader as illustrated for work machine 100, may perform many work functions across a range of industries. The principles of this disclosure could be applied to other machines having more focused capabilities, such as a wheel loader, excavator, dump truck, backhoe, motor grader, material handler or the like.

As generally embodied in FIG. 1, work machine 100 includes a body or frame 102, that houses and supports a variety of components and assemblies. Work machine 100 travels in a forward direction from right to left along the X-axis in FIG. 1, such that for purposes of reference, the sides of work machine 100 are generally denoted as front side 104, left side 106, right side 108, top side 110, and rear side 112. For purposes of illustration and reference, and in general, front side 104 and rear side 112 are depicted in the Y-Z plane, left side 106 and right side 108 are shown in the X-Z plane, and top side 110 is positioned in the X-Y plane.

Work machine 100 includes continuous tracks 114 on its left side 106 and right side 108 that rotationally propel the machine. A set of wheels 116 is enclosed by, and at least some of those wheels are engaged with, tracks 114 and causes tracks 114 to rotate and move work machine 100. Work machine 100 can cause tracks 114 to operate at multiple speeds and in a forward and a reverse direction. Tracks 114 are independently controlled and activated, thereby enabling turning of work machine 100 outside of a linear path, often within a small radius, and providing overall skid-steering maneuverability.

In addition, a pair of lift arms 118 are pivotably attached to frame 102 through a linkage 119 and extend longitudinally in the X-axis on both left side 106 and right side 108 of work machine 100. Lift arms 118 rotate in conjunction with linkage 119 around pivot points 120 near the top side 110 to provide a raising and lowering action for the front of lift arms 118. Although not shown in the figures, lift arms 118 support a work tool at their ends at front side 104 of work machine 100 for executing a work function. The work tool may be any item for assisting in executing a function, typically a loader or bucket. Any other tool could alternatively be attached depending on the need, such as a pallet fork, broom, grinder, tiller, rake, blade, or auger. Lift arms 118 include many ancillary components to assist with their operation that are not discussed in this disclosure solely for purposes of simplicity, such as lift linkages, power trains, hydraulic pumps, motors, valves, hydraulic lines, and a hydraulic tank.

As shown in FIG. 1, work machine 100 includes an operator cabin, or cab 122, positioned somewhat forward toward front side 104 on frame 102. Cab 122 is situated between lift arms 118 and includes a seat and various controls and electronics for operating work machine 100. The controls and electronics may include a plurality of devices, such as joysticks, pedals, levers, user interfaces, and other types of display and input devices to control various operations associated with work machine 100, such as controlling lift arms 118 and independently activating tracks 114. Cab 122 typically is surrounded by a cage to provide protection for an operator seated within while enabling adequate visibility to the surroundings. Cab 122 may have a rear window or opening to provide visibility behind the operator from within cab 122.

Work machine 100 also includes an engine compartment 124 that is rear mounted on frame 102. By "rear mounted," it is meant that engine compartment 124 is positioned closer to rear side 112 of work machine 100 than to front side 104. More specifically, engine compartment 124 is mounted behind operator cab 122, along the X-axis as in FIG. 1, relative to front side 104 of work machine 100. An engine not shown in FIG. 1 is housed within engine compartment 124 and has substantial weight relative to the rest of work machine 100. By being rear mounted toward rear side 112 in work machine 100, engine compartment 124 helps provide ballast and may counterbalance a heavy load imparted by or on a work tool attached to lift arms 118 at front side 104 of work machine 100.

A grille 126 is positioned along a back wall of at least a portion of engine compartment 124 at a rear side 112 of work machine 100. Grille 126, representatively shown in FIG. 1 with slats or louvers, may include a framework or structure for covering rear side 112 of engine compartment 124 while still allowing the passage of air therethrough. Air is drawn through grille 126 to help cool engine compartment 124, although an ejection of air through grille 126 is also possible for other examples.

Figure 2:
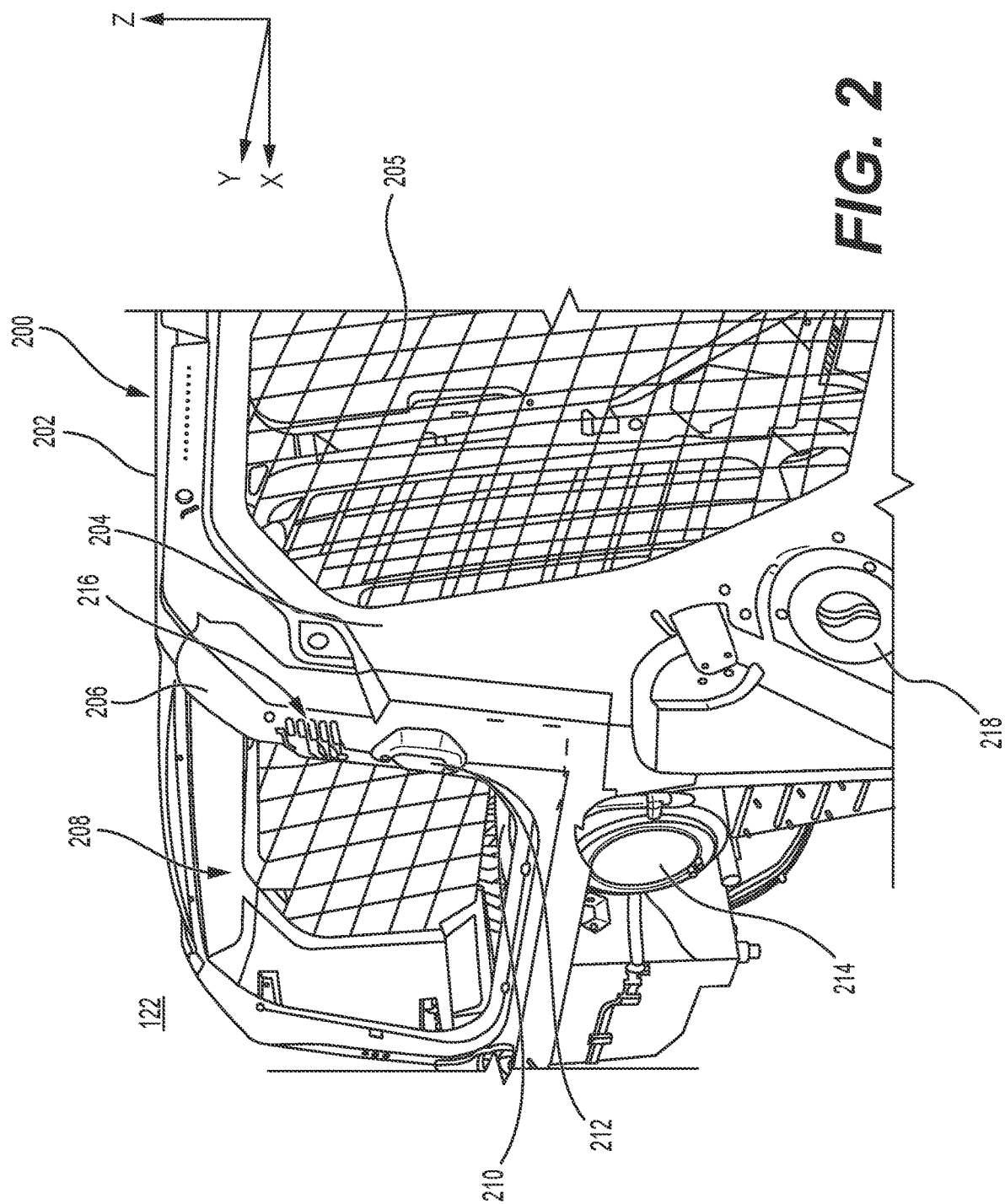
FIG. 2 is a fractional isometric view of a cutaway from a rear right side of the compact loader in FIG. 1 in accordance with an example of the present disclosure.

While FIG. 1 depicts an exterior of work machine 100 from a perspective of the left rear corner of the machine, FIGS. 2-5 illustrate more detailed views of work machine 100 relative to the present disclosure. For instance, FIG. 2 is a fractional isometric view from the perspective of a rear right side of work machine 100 in FIG. 1. In particular, in the cutaway of FIG. 2, at least one of lift arms 118 and engine compartment 124 are virtually removed to expose a rear corner of cab 122 viewed from right side 108. The following discussion refers interchangeably between the different perspectives of work machine 100 shown in FIGS. 2-5.

Referring to FIG. 2, cab 122 in work machine 100 in an example of a compact loader includes a rollover protection structure (ROPS) 200. As known to those skilled in the art, a ROPS generally is a supportive structure surrounding and enclosing an operator compartment for the purpose of protecting the operator and the components within the ROPS in the event the work machine rolls over. In that situation, the weight of work machine 100 may be borne largely by the roof of cab 122. Accordingly, a ROPS includes sufficient supportive material and protective structures to guard against collapse of cab 122 when bearing the weight of work machine 100, as well as generally protecting the operator within the ROPS from injury in the event work machine 100 is tipped or when otherwise operating work machine 100.

As generally embodied in FIG. 2, ROPS 200 includes a roof 202, a side sheet 204, and a rear panel 206, among other structural features. In some examples, roof 202, side sheet 204, and rear panel 206 are metal sheets, such as steel having a few millimeters in thickness and stamped into a desired shape. Roof 202 covers the top surface of cab 122 and has sufficient structural stability to resist a collapse or other significant deformation in case of a rollover of work machine 100. Side sheet 204 helps provide structural integrity to right side 108 of cab 122. In typical operation with work machine 100 situated in its upright position on a level surface according to the XYZ axis in FIG. 2, side sheet 204 at least provides vertical support along the Z-axis for roof 202 and side protection for the operator from impact or collisions from surrounding obstacles. A protective cage 205, such as wire mesh, fills open areas along right side 108 of ROPS 200 adjacent to side sheet 204. Protective cage 205 provides visibility for the operator along right side 108 while guarding against potential injury from impacts or rollovers. Although not shown, left side 106 of cab 122 has similar supportive and protective structures.

Rear panel 206 spans rear side 112 of cab 122. As shown in FIG. 2, rear panel 206 in one example generally has a U-shape and frames right, left, and bottom sides of rear port 208. Rear port 208 may be a rear window or opening within a rear side 112 of ROPS 200, which provides visibility for an operator within cab 122 to see behind work machine 100. As viewed through rear port 208 from outside the machine, ROPS 200 in some examples includes rear shelf 210 inside cab 122 at a position below rear port 208 with respect to the Z-axis. Rear shelf 210 provides structure along the Y-axis, i.e., horizontally, across rear side 108 of ROPS 200. Utility access 212 may be provided through rear panel 206, as shown in FIG. 2, to enable connection of cables or wires from the outside to cab 122 for specialized purposes not material to the present disclosure.

As with side sheet 204, rear panel 206 helps provide vertical support along the Z-axis for roof 202 and general protection for the operator inside cab 122 against potential impacts or rollovers. The U-shape to rear panel 206 includes upwardly extending arms on the left and right sides of rear port 208 in the example of FIG. 2. As such, those left and right sides of rear panel 206 contribute to forming what might traditionally be viewed as pillars or posts at the corners of ROPS 200 to help support roof 202 and to provide overall structure to cab 122. In some examples such as FIG. 2, the implementation of rear panel 206 leads to a functional pillar formed from sheets of steel rather than, for instance, a single pole at each corner of ROPS 200. The structure within ROPS 200 forming pillars at the corners, or otherwise providing structural support for roof 202, may be either a single material or a composite of multiple sheets of material depending on the implementation.

As generally illustrated in FIG. 2, and discussed in more detail below regarding FIGS. 3-5, work machine 100 includes an HVAC system and affiliated air retrieval system to condition the environment for the operator within cab 122. The HVAC system may control air within cab 122 to affect factors such as temperature, humidity, and particulate count. Particularly for compact loaders and similar machines that often operate in dusty worksites, filtering dirt and debris from the air can impact the use of work machine 100 by an operator. Similarly, filtering by the HVAC system can help reduce noxious fumes, smoke, or odors present outside work machine 100.

The HVAC air retrieval system of work machine 100 includes HVAC unit 214, air inlet 216, and air filter 218. The cutaway of FIG. 2 reveals HVAC unit 214 positioned at a middle portion of ROPS 200 within cab 122. HVAC unit 214 includes a blower fan, evaporator coil, and heater coil (not shown) that function together to move and condition air drawn in by HVAC unit 214. In general operation, HVAC unit 214 creates a pressure differential to draw ambient air from outside work machine 100 and to draw recirculated air from within cab 122, and then filters, mixes and conditions the drawn air. Although not shown in the figures, a blower fan within HVAC unit 214 passes the conditioned air through ducts to be distributed via a plurality of vents within cab 122.

When operating, HVAC unit 214 draws ambient air from the environment outside work machine 100 into air inlet 216 through rear panel 206. As shown in FIG. 2 and discussed in more detail below, air inlet 216 in some examples is located within an upper portion of the right pillar of rear panel 206. By upper portion, it is meant that air inlet 216 is proximate to roof 202 and, in the example of FIG. 2, at least closer to roof 202 than to rear shelf 210 or the horizontal section of U-shaped rear panel 206. In this elevated position along the Z-axis relative to the height of work machine 100, air inlet 216 can draw ambient air that has fewer particulates than air closer to the ground, particularly near to traction devices such as tracks 114. Accordingly, ambient air drawn into air inlet 216 in most circumstances will require less filtering than air taken in from a lower inlet location around cab 122.

In some examples, air filter 218 performs the filtering and removal of particulates from the ambient air drawn into air inlet 216. Air filter 218 may take many forms known to those skilled in the field, and in the examples shown is a substantially cylindrical filter positioned in the Z-axis vertically below both air inlet 216 and HVAC unit 214. Air filter 218 is configured so that a person may readily access, remove, clean, or replace air filter 218 while standing on the ground. As such, in the example of FIG. 2, air filter 218 is positioned within a portion of side sheet 204 near tracks 114. Other locations may be selected for air filter 218 as suitable for the particular implementation.

Figure 3:
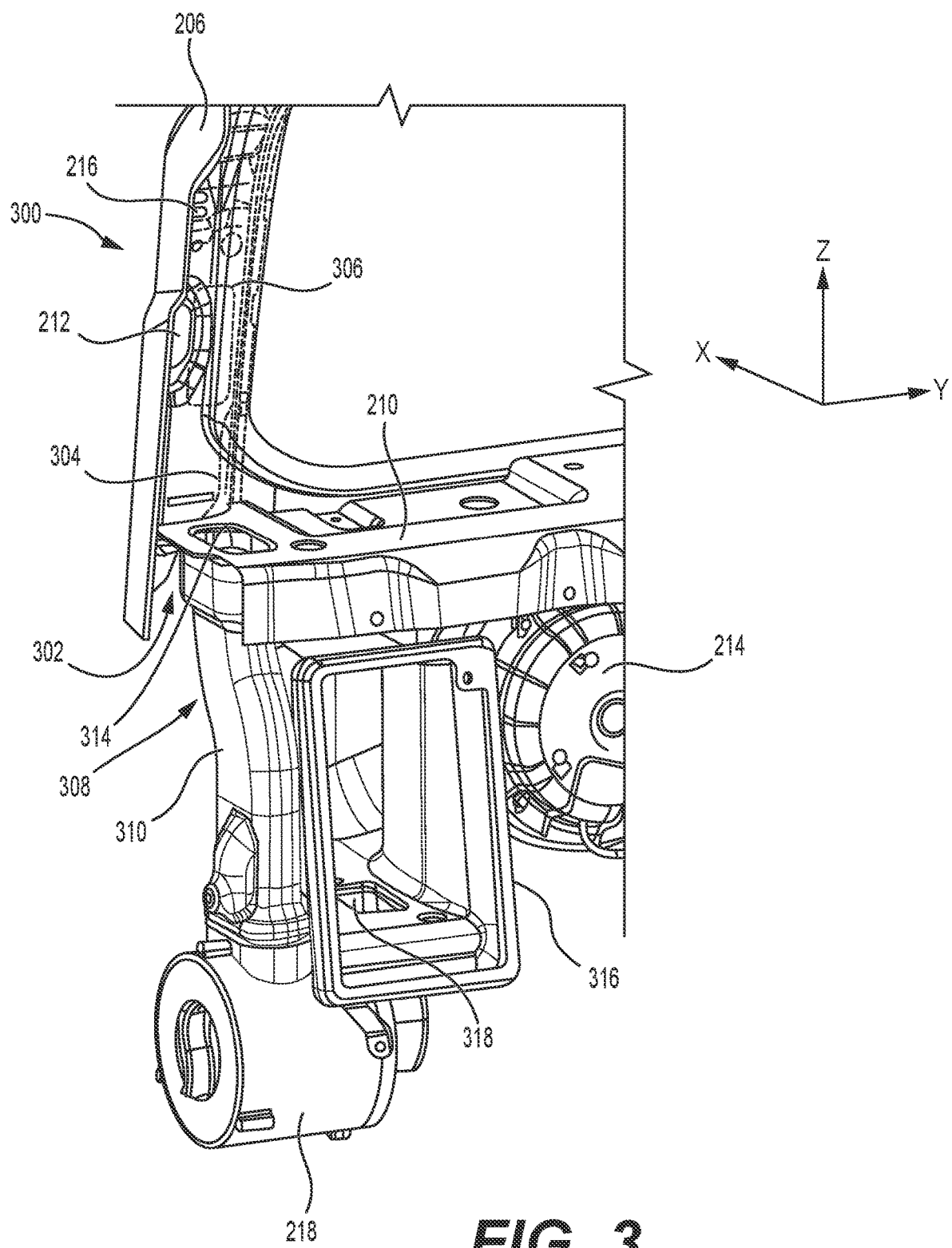
FIG. 3 is a fractional isometric view of a first cutaway from a front right side of an HVAC air retrieval system in accordance with an example of the present disclosure.
Figure 4:
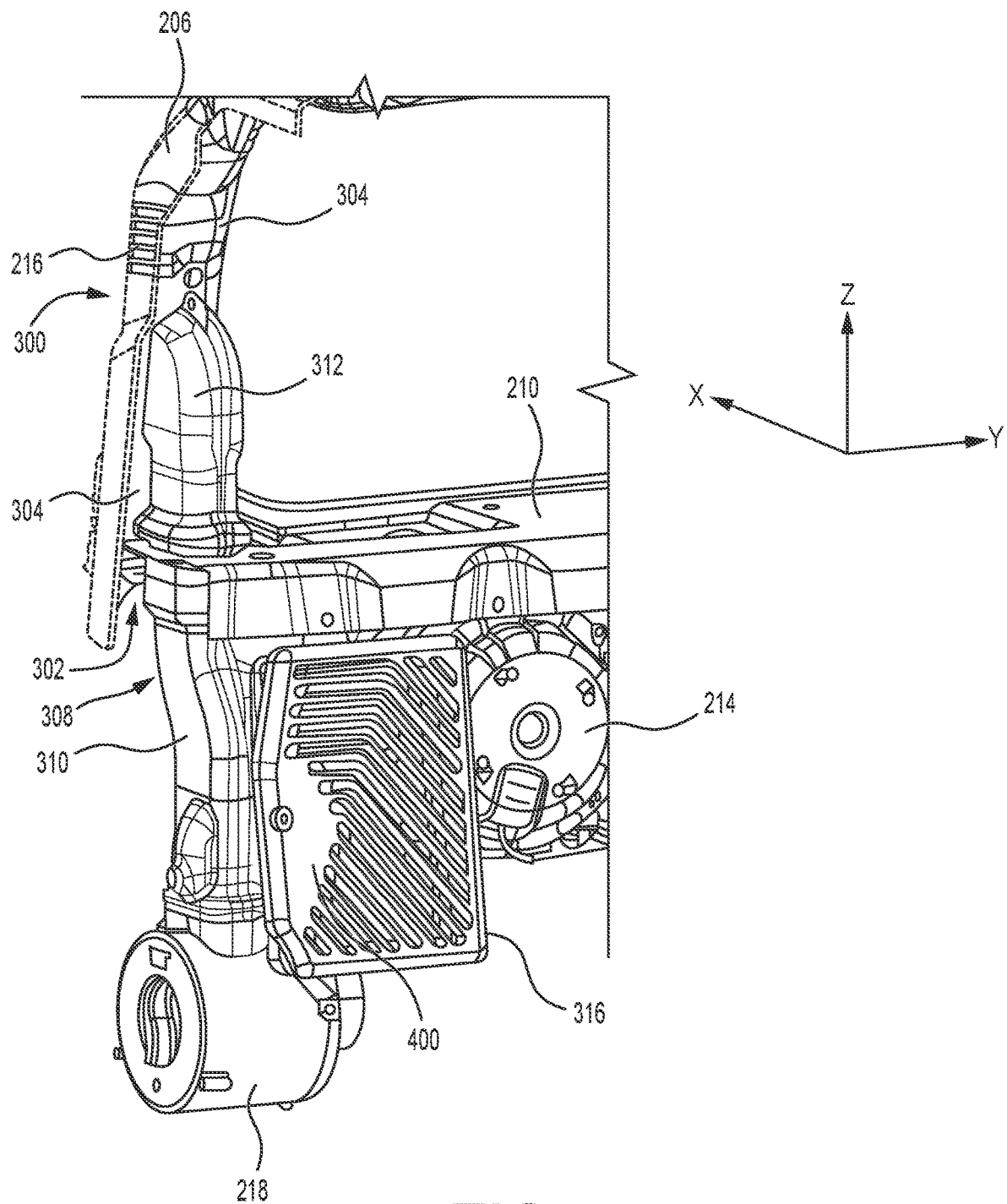
FIG. 4 is a fractional isometric view of a second cutaway from a front right side of an HVAC air retrieval system in accordance with an example of the present disclosure.

While FIG. 2 shows a perspective of cab 122 from a right rear corner, FIGS. 3 and 4 are fragmentary isometric cutaway views looking rearwardly from right side 112. Various components such as tracks 114, side sheet 204, and protective cage 205 have been virtually removed to help show the features of the air retrieval system for HVAC unit 214. FIG. 3 removes additional parts compared with FIG. 4 to better illustrate the construction of the HVAC air retrieval system. FIG. 5 then shows a cross-section of several ducts of the HVAC air retrieval system illustrated in FIGS. 3 and 4.

Referring first to FIG. 3, the rear view of cab 122 includes HVAC unit 214 below rear shelf 210 and the cab-facing side of a right portion of rear panel 206 adjacent and above rear shelf 210, as discussed above with respect of FIG. 2. From the view of FIG. 3, an arcuate shape of rear panel 206 partially shown in FIG. 2 becomes evident. A second adjoining and facing piece, inner panel 304, is shown in phantom lines in FIG. 3 and in solid lines in FIG. 4 (for purposes of illustration, rear panel 206 is shown in solid lines in FIG. 3 and in phantom lines in FIG. 4). Rear panel 206 and inner panel 304 together form what may be termed an outer duct 300. In one example, outer duct 300 is formed by spot welding stamped sheet metal in the form of rear panel 206 and inner panel 304, so that together the two form a structural support for roof 202 in the form of a pillar. Other methods for joining rear panel 206 and inner panel 304 are contemplated and known to those of ordinary skill in the field. In another aspect, rear panel 206 and inner panel 304 are shaped such that their joinder results in a hollow space or cavity within outer duct 300, also termed an outer conduit 500 (FIG. 5). In some examples, outer duct 300 extends from roof 202 to a region slightly below rear shelf 210 on rear side 108 of cab 122.

Air inlet 216 provides a passage through rear panel 206 for the ingress of ambient air into outer duct 300. Air inlet 216 may take many forms depending on the implementation, and, in the examples illustrated, air inlet 216 includes slats or louvers dividing an open region between the environment and outer conduit 500. Slats function to block the passage of solid materials larger than the gaps formed between the slats and into outer duct 300. Similar structures such as a screen or mesh may be interchangeable with slats. Accordingly, in addition to being positioned at a relatively high vertical position on work machine 100 to decrease the intake of particulates, air inlet 216 in the illustrated example includes blocking structure as a coarse filter or precleaner for the air that flows into outer duct 300. Air inlet 216 may be configured differently or include additional structure to assist in the precleaning function. For example, a rain cap or angled louvers may be employed to help block water from entering outer duct 300.

At a lower end of outer duct 300 along the Z-axis, rear panel 206 and inner panel 304 extend apart from each other, forming debris outlet 302. As shown in the cross-section of FIG. 5, outer conduit 500 therefore extends as a cavity within outer duct 300 from air inlet 216 downwardly to debris outlet 302. As air inlet 216 is open to the atmosphere, water 508 in the form of rain and non-gaseous debris smaller than the gaps between the slats may pass through air inlet 216. The debris could be dirt particles, stones, insects, or pieces of vegetation, for example. Outer duct 300 is configured in a substantially vertical orientation with respect to the Z-axis in FIGS. 3-5 when work machine 100 is on a level surface such as along the X-axis. As a result, gravity tends to pull items denser or heavier than air, such as water 508 and other non-gaseous debris, downward through outer conduit 500 along water path 510. With debris outlet 302 being open to the atmosphere, water 508 and other non-gaseous debris will exit through outer conduit 500 generally along water path 510 and return to the environment outside of work machine 100.

Referring to FIG. 3, inner panel 304 of outer duct 300 is generally solid in form but includes an orifice 306 shown in phantom passing through its thickness. In the examples illustrated, orifice 306 is substantially rectangular in shape, although any geometric shape will suffice. Orifice 306 is positioned a short distance downstream or below air inlet 216 in outer duct 300 with respect to the vertical Z-axis. In one implementation, a distance from the uppermost opening of air inlet 216 within rear panel 206 to an uppermost opening of orifice 306 within inner panel 304 is about 110 mm.

As generally embodied in FIG. 4, the air retrieval system of the present disclosure further includes air duct 308 providing a fluid passageway from orifice 306 to air filter 218. Air duct 308 may be one or more components, and in the examples illustrated, air duct 308 includes lower duct 310 and upper duct 312. Lower duct 310 and upper duct 312 are substantially tubular in shape, providing inner conduit 502 (FIG. 5) for the passage of ambient air within. While tubular in the examples, air duct 308 may take any desired form sufficient to pass ambient air from orifice 306 to air filter 218. In some examples, air duct 308 is a polymeric material such as extruded or molded plastic, although other materials with similar characteristics of light weight, moderate flexibility, and resiliency (such as aluminum) would suffice.

Figure 5:
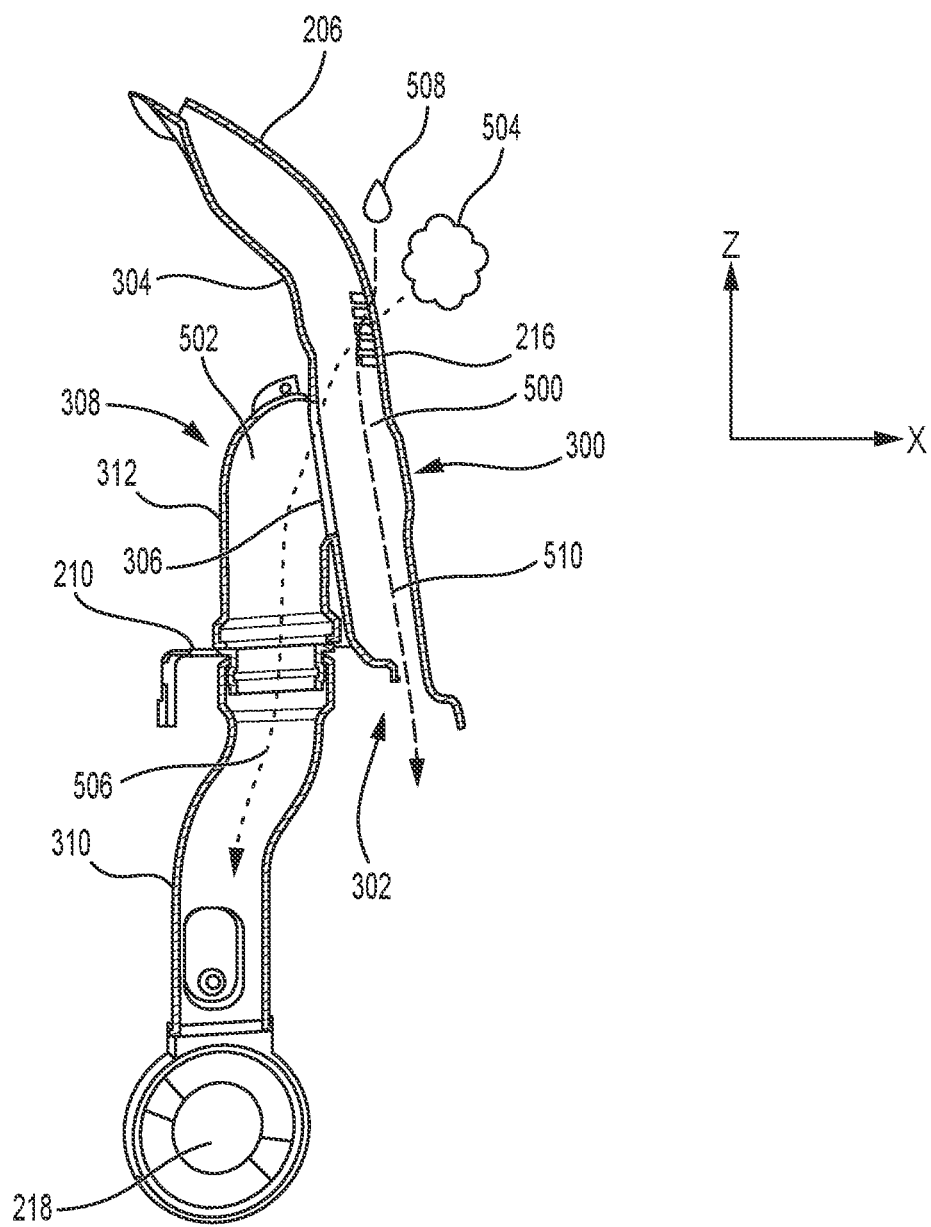
FIG. 5 is a side view of a cross-section of an HVAC air retrieval system in accordance with an example of the present disclosure.

Referring to FIGS. 4 and 5, upper duct 312 extends from rear shelf 210 vertically upwardly with respect to the Z-axis and culminates in an opening that mates with orifice 306. Rear shelf 210 provides structural support for mounting a bottom portion of upper duct 312 and holding upper duct 312 in place. Attachment devices, such as screws, bolts, or rivets, may be used to secure upper duct 312 and lower duct 310 to ROPS 200. In the example shown, lower duct 310 has a duct interface 314 at an upper end that mates to upper duct 312 at or below rear shelf 210. Duct interface 314 and lower duct 310 thereby provide a fluid passageway from upper duct 312 to air filter 218 at an opposite lower end of lower duct 310.

As a result, combining the views of FIGS. 3-5, air inlet 216, a short portion of outer conduit 500, orifice 306, and inner conduit 502 through upper duct 312 and lower duct 310 collectively provide an air path 506 for ambient air 504 from the environment to air filter 218 of HVAC unit 214. The operation of a blower fan as part of HVAC unit 214 will generate a pressure differential or suction to pull ambient air 504 into air inlet 216. With ambient air 504 being lighter and less dense than water 508, the pressure differential generated by HVAC unit 214 will be of sufficient magnitude to divert ambient air 504 from outer conduit 500 and into orifice 306. To the contrary, the pressure differential from HVAC unit 214 will not be sufficient to divert the heavier water 508 and other non-gaseous debris from outer conduit 500. Therefore, as ambient air 504 continues along air path 506, unwanted water 508 and other non-gaseous debris will be largely prevented from entering inner conduit 502, which could otherwise result in saturating air filter 218.

FIG. 5 shows that air duct 308 is disposed laterally from outer duct 300, leading to a generally side-by-side alignment of outer conduit 500 and inner conduit 502. With the offset arrangement of air duct 308, outer conduit 500 and inner conduit 502 tend to form an "inverted V" shape, which is best illustrated by relationships of air path 506 and water path 510 in FIG. 5. While outer conduit 500 and inner conduit 502 are side-by-side and approximately parallel, orifice 306 causes enough of a diversion of ambient air 504 as to effectively separate ambient air 504 from water 508. The arrangement for the air retrieval system in the illustrated implementation leads to ambient air 504 traveling in a substantially straight path from air inlet 216 into orifice 306 and through inner conduit 502, with heavier debris traveling also in a substantially straight path downward through outer conduit 500, with the two paths being separated by about a 45 degree angle. In an extreme situation, a portion of the ambient air may take a substantially right-angle turn from outer conduit 500 into inner conduit 502.

After air filter 218, ambient air 504 drawn into air path 506 passes into plenum 316 via mixing port 318, as shown in FIGS. 3 and 4. In some examples, plenum 316 is located at a side of an operator seat within cab 122. Within plenum 316, ambient air 504 is mixed with recirculated air drawn from within cab 122 into plenum 316. A plenum filter 400 typically covers plenum 316 and helps to clean the recirculated air. Finally, the mixed air is drawn in together by HVAC unit 214, conditioned to affect its temperature, and blown through output ducts (not shown) for distribution in cab 122.

Consistent with certain implementations of the present disclosure, outer duct 300 and air duct 308 are configured to provide sufficient air flow for HVAC unit 214 without causing a deleterious pressure drop between air inlet 216 and air filter 218. For example, the air intake assembly does not possess sharp bends, narrow passages, or similar flow restrictions, as is present in other known systems. As noted above, at least part of air path 506 can approximate a straight line from air inlet 216 to air filter 218 and, in extreme situations, other parts of air path 506 may execute a substantially right-angle turn from outer conduit 500 into inner conduit 502. But in a typical situation, air path 506 will range from 0 degrees to about 45 degrees of deflection from outer conduit 500 into inner conduit 502. If desired, the positioning and angling of air duct 308 could be adjusted to further enhance the direct line of air path 506. Thus, sharp bends that may impede the free and direct flow of ambient air 504 are minimized.

The air intake assembly as illustrated and described further avoids a deleterious pressure drop because its length is relatively short, particularly when combined with the cross-sectional areas of its passageways. In one implementation, a vertical height of air duct 308 in the implementation is about 540 mm, and the distance from the uppermost opening of air inlet 216 to a center of air filter 218 is about 625 mm. The lower end of lower duct 310 is about 300 mm below rear shelf 210. Across the flow path from air inlet 216 to air filter 218, the cross-sectional area through the flow path from air inlet 216 to air filter 218 is relatively constant, ranging from about 2000 mm$^2$ to about 3600 mm$^2$. The cross-sectional area within outer conduit 500 is over 3000 mm$^2$. Moreover, in some examples, the cross-sectional area throughout air duct 308 is larger than the cross-sectional area at the entrance to air filter 218, which can be about 3000 mm$^2$. As a result, ambient air 504 faces little restriction to flow from air inlet 216 to air filter 218, and mechanisms additional to HVAC unit 214, such as a differential-pressure blower or pressurization blower, are not required to draw in sufficient ambient air for HVAC unit 214.

In some implementations, air inlet 216 is configured to be smaller in effective cross-sectional area than other cross sections along air path 506, particularly at the inlet to air filter 218. A smaller area for air inlet 216 may help further deter the ingress of water 508 and non-gaseous debris. To overcome that slight restriction to air flow, the disclosed air intake assembly enables supplemental intake of ambient air 504 through debris outlet 302. While conventional implementations may block and seal an outlet for rainwater and other debris to help control pressure throughout the air ducts, outer duct 300 maintains debris outlet 302 with open passage to the environment. Accordingly, to the extent HVAC unit 214 provides sufficient negative pressure to draw a small amount of supplemental ambient air 504 inward due to a partial constriction at air inlet 216, debris outlet 302 allows that supplemental ambient air 504 to enter outer duct 300 from the bottom of outer conduit 500. Thus, if air inlet 216 is smaller in cross-sectional area than an inlet to air filter 218, either by design or by becoming partially blocked by debris, debris outlet 302 provides an alternative path to feed ambient air 504 to air filter 218 and HVAC unit 214.

With the open design for debris outlet 302, cleaning of accumulated debris or rainwater from outer conduit 500 or other maintenance of outer duct 300 is not required. If desired, outer duct 300 may be flushed at times, but in general debris outlet 302 and gravity will enable the natural removal of any water 508 and non-gaseous debris entering into air inlet 216.

Figure 6:
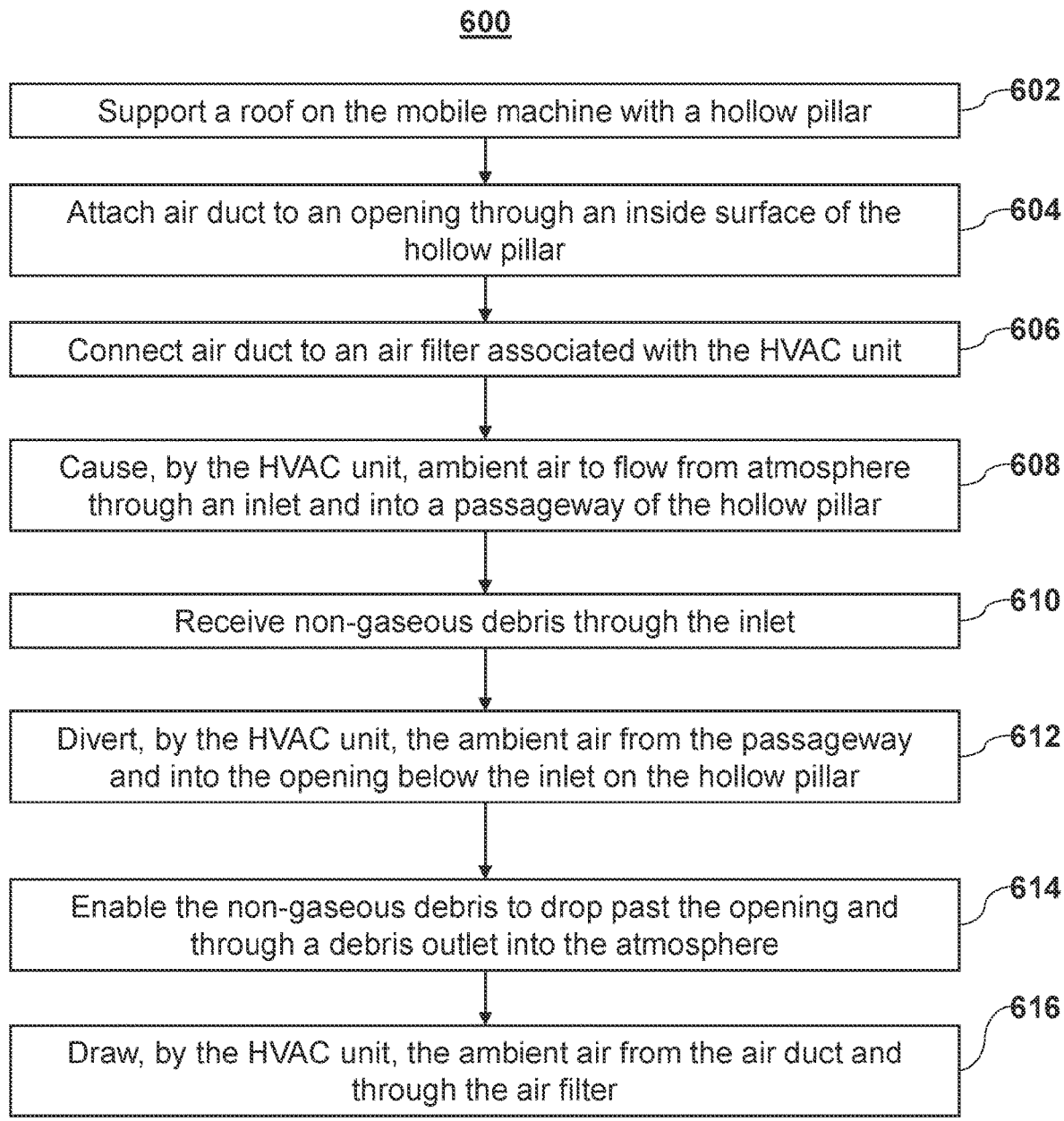
FIG. 6 is a flow chart depicting a method of providing air to an HVAC unit in accordance with an example of the present disclosure.

Turning from the structure of work machine 100 as illustrated in FIGS. 1-5 to a method for providing air to an HVAC unit of a mobile machine, FIG. 6 is a flowchart of a representative method for a compact loader such as work machine 100. Generally embodied as 600 in FIG. 6, the method begins with a step 602 of at least partially supporting a roof on the mobile machine with a hollow pillar. As discussed in detail above, multiple sheets of metal such as rear panel 206 and inner panel 304 may be configured to form a hollow pillar for roof 202 within ROPS 200, as an example. Further, in step 604, a first end of an air duct is attached to an opening through an inside surface of the hollow pillar. In some examples, air duct 308 may be sealingly attached to orifice 306 within inner panel 304, as shown in FIGS. 4 and 5. In a third step 606, a second end of air duct 308 is connected to air filter 218 associated with HVAC unit 214.

In further steps of method 600, the HVAC unit causes ambient air to flow from atmosphere through air inlet 216 and into a passageway of the hollow pillar. This step 608 in some examples involves air inlet 216 being located on an outside surface of outer duct 300 a small distance below roof 202 relative to the height of work machine 100. In addition, step 610 of method 600 includes receiving non-gaseous debris through the inlet and into the passageway. This non-gaseous debris includes, in common examples, water 508. As well, the HVAC unit, such as HVAC unit 214, diverts ambient air 504 from the passageway and into the opening below the inlet on the hollow pillar with respect to a vertical axis of the mobile machine in step 612. As shown specifically in FIG. 5, ambient air 504 may be caused to traverse air path 506 through orifice 306. Along with the diversion of ambient air 504, the non-gaseous debris is allowed to drop past the opening and through a debris outlet 302 into the atmosphere (step 614). Finally, in step 616, the HVAC unit draws the ambient air 504 from the air duct 502 and through the air filter 218.

Those of ordinary skill in the field will appreciate that the principles of this disclosure are not limited to the specific examples discussed or illustrated in the figures. For example, while the examples address outer duct 300 formed within layers of rear panel 206 and inner panel 304 for a right rear corner of cab 122, outer duct 300 could be formed in one or more other corners or sides of cab 122. Moreover, outer duct 300 need not include support characteristics of a pillar for roof 202. Instead, the features of a conduit for ambient air 504 and water 508 for outer duct 300 could be implemented within any side or corner of cab 122, while providing support functionality through other structures within ROPS 200.

Similarly, while the disclosure describes a structure for ROPS 200 made of multiple sheets of metal, a support frame for cab 122 could use posts or beams of a single material in a more conventional manner. Air inlet 216 and outer conduit 500 could similarly be implemented within one of such posts or beams that are hollow. Other variations will be apparent to those skilled in the field.

INDUSTRIAL APPLICABILITY

The present disclosure provides a work machine having an air intake assembly and methods for providing ambient air to an HVAC unit of the work machine with the air intake assembly. Positioned on the side of a ROPS proximate the roof, an air inlet of the air intake assembly accepts ambient air and water into a conduit that drains the water back to the environment, while an adjacent air duct diverts the ambient air into a pathway to an air filter of the HVAC unit. The air intake assembly may be used in a work machine such as a compact loader to draw in air with few particulates from a location high in the machine, while directing water away from the air filter and back to the environment. A short air pathway with minimal bends combined with cross-sectional areas larger than a cross-sectional area at an inlet to the air filter avoids significant resistance to air flow. As a result, the air intake assembly may improve the efficiency of the work machine by avoiding the need for a supplemental blower to overcome a pressure drop in the air ducts and the need to flush a debris collector, as in existing systems. In addition, air filters for the compact loader do not need to be serviced or changed as often, saving costs.

As noted above with respect to FIGS. 1-6, an example work machine 100 generally includes a frame, traction devices, and an operator cab 122. A roof 202 covers the cab while a substantially enclosed conduit, such as outer conduit 500, extends downwardly from the roof with respect to the vertical axis. The conduit includes an inlet, such as air inlet 216, into the conduit from atmosphere proximate to the roof, an outlet, such as debris outlet 302, into the atmosphere downstream from the inlet, and an orifice 306 into the conduit between the inlet and the outlet. An air duct 308 has a first end connected to the orifice of the conduit and second end coupled to air filter 218. The air filter is positioned for access at an external location of cab 122. An HVAC unit 214 is configured to draw ambient air from air inlet 216 and through air filter 218.

In examples of the present disclosure, the air intake assembly of outer duct 300 and air duct 308 effectively separates non-gaseous debris, such as rain water and dirt particles, from ambient air without requiring additional blowers. Gravity pulls the debris downward through outer conduit 500 and back to the environment through the opening of debris outlet 302 in a substantially straight water path 510. Negative pressure from HVAC unit 214 draws ambient air from outer conduit 500 into inner conduit 502 along a substantially straight air path 506 offset from water path 510 by an acute angle. The air path 506 has few bends of small angles, with the angles particularly being less than about 45 degrees. Moreover, integrating outer duct 300 within a support structure for roof 202 avoids the need for additional structure such as ducting external to ROPS 200 that may be damaged during operation of the machine. Accordingly, cleaner air may be efficiently drawn into HVAC unit 214 using few parts, while air filter 218 is easily serviceable at a side of cab 122 by a person standing on the ground.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A work machine, comprising:
   a frame defining a horizontal axis and a vertical axis for the work machine, the frame having a left side and a right side with respect to a direction of forward travel of the work machine;
   traction devices coupled to the left side and the right side of the work machine;
   an operator cabin between the left side and the right side of the work machine;
   a roof covering the operator cabin;
   a conduit extending downwardly from the roof with respect to the vertical axis, the conduit comprising:
      an inlet into the conduit from external atmosphere, the inlet located on an exterior side of the conduit with respect to the operator cabin and proximate to the roof,
      an outlet open to the external atmosphere downstream from the inlet and distal to the roof, and
      an orifice into the conduit between the inlet and the outlet;
   an air duct having a first end connected to the orifice of the conduit and a second end;
   an air filter coupled to the second end of the air duct and positioned for access at an external location of the operator cabin; and
   a heating, ventilation, and air conditioning (HVAC) unit configured to draw ambient air from the inlet and the outlet and through the air filter.

2. The work machine of claim 1, wherein a pathway from the inlet to the air filter has between 0 and 45 degrees of deviation.

3. The work machine of claim 2, wherein the conduit has an interior side with respect to the operator cabin, the orifice being on the interior side.

4. The work machine of claim 3, wherein cross-sectional areas within the air duct are larger than a filter cross-sectional area at an input to the air filter.

5. The work machine of claim 4, wherein a conduit cross-sectional area within the conduit between the inlet and the orifice is larger than the filter cross-sectional area.

6. The work machine of claim 1, wherein the outlet is configured to pass debris unimpeded from the conduit into the external atmosphere.

7. The work machine of claim 1, wherein the conduit is configured to allow gravity to pull substances heavier than air from the inlet to the outlet while drawing in the ambient air from the outlet and to the air filter.

8. The work machine of claim 1, further comprising pillars supporting the roof over the operator cabin, wherein one of the pillars includes the conduit.

9. The work machine of claim 1, wherein the air duct defines a passageway configured to draw air from the orifice downwardly to the air filter with respect to the vertical axis, the air filter being below the outlet with respect to the vertical axis.

10. The work machine of claim 1, further comprising:
a plurality of metal sheets supporting the roof, the plurality of metal sheets having an upper portion and a lower portion, the upper portion being closer to the roof, the plurality of metal sheets comprising:
an outer sheet and an inner sheet at least partially defining the conduit;
the inlet extending through the outer sheet in the upper portion, the inlet fluidly connecting the external atmosphere outside the operator cabin with the conduit; and
the orifice extending through the inner sheet and below the inlet with respect to a vertical axis, the orifice fluidly connecting the conduit with the air duct.

11. The work machine of claim 10, wherein the air duct defines a pathway configured to draw air from the inlet to the air filter with less than 45 degrees of deviation.

12. The work machine of claim 10, wherein the conduit is configured to allow gravity to pull substances heavier than air from the inlet and through the outlet from the conduit positioned in the lower portion of the metal sheets below the orifice with respect to the vertical axis, the outlet fluidly connecting the conduit with the external atmosphere.

13. The work machine of claim 10, wherein the air duct defines a pathway configured to draw air from the outlet to the air filter, the pathway below the orifice with respect to the vertical axis being approximately parallel to the conduit.

14. The work machine of claim 10, wherein the outer sheet and the inner sheet are positioned to support a first rear corner of the roof relative to a direction of forward travel of the work machine, and the outer sheet is further positioned to support a second rear corner of the roof.

15. The work machine of claim 1, further comprising a rollover protection structure, the rollover protection structure including a protective cage surrounding at least a portion of the operator cabin.

16. A method for providing air to a heating, ventilation, and air conditioning (HVAC) unit of a mobile machine, comprising:
operating the mobile machine, the mobile machine comprising:
a frame defining a horizontal axis and a vertical axis for the mobile machine, the frame having a left side and a right side with respect to a direction of forward travel of the mobile machine,
traction devices coupled to the left side and the right side of the mobile machine,
an operator cabin between the left side and the right side of the mobile machine,
a roof covering the operator cabin,
a hollow pillar within the frame at least partially supporting the roof on the mobile machine and having an opening through an inside surface, and
an air duct having a first end attached to the opening of the hollow pillar and a second end connected to an air filter associated with the HVAC unit;
causing, by the HVAC unit, ambient air to flow from atmosphere through the inlet and into a passageway of the hollow pillar, the inlet being in an outside surface of the hollow pillar proximate the roof;
receiving non-gaseous debris through the inlet and into the passageway;
diverting, by the HVAC unit, the ambient air from the passageway and into the opening below the inlet on the hollow pillar with respect to a vertical axis of the mobile machine;
enabling the non-gaseous debris to drop past the opening and through a debris outlet open to the atmosphere; and
drawing, by the HVAC unit, the ambient air from the air duct and from the debris outlet and through the air filter.

17. The work machine of claim 16, wherein the orifice and the air duct are on an interior of the rollover protection structure.

18. The method of claim 16, further comprising blocking non-gaseous debris above a predetermined width from entering the inlet.

19. The method of claim 16, wherein the diverting the ambient air is, at least in part, less than 90 degrees from the passageway into the air duct.

20. The method of claim 16, wherein the drawing the ambient air from the air duct comprises passing the air through an inlet to the air filter having a cross-sectional area smaller than the cross-sectional areas within the air duct and within the passageway.

* * * * *